RECORD CHANGER

Filed Sept. 28, 1966 3 Sheets-Sheet 1

Inventors
Robert J. Hammond
and John F. Arent
By Brown, Jackson, Boettcher & Dienner
Att'ys.

RECORD CHANGER

Filed Sept. 28, 1966 3 Sheets-Sheet 2

Inventors
Robert J. Hammond
and John F. Arent
By Brown, Jackson, Boettcher & Dienner
Att'ys.

RECORD CHANGER

Filed Sept. 28, 1966 3 Sheets-Sheet 3

Inventors
Robert J. Hammond
and John F. Arent
By Brown, Jackson, Boettcher & Dienner
Att'ys.

United States Patent Office 3,533,632
Patented Oct. 13, 1970

3,533,632
RECORD CHANGER

Robert J. Hammond, Stevensville, and John F. Arent, Benton Harbor, Mich., assignors to V-M Corporation, Benton Harbor, Mich., a corporation of Michigan Filed Sept. 28, 1966, Ser. No. 582,689
Int. Cl. G11b *17/06*
U.S. Cl. 274—1 10 Claims

ABSTRACT OF THE DISCLOSURE

A wand moves with the tone arm between a photocell and a lamp to occlude illumination of the photocell during record play. As the tone arm moves to adjacent the center of the turntable the wand passes beyond the lamp illumination of the photocell closes a circuit energizing a change cycle mechanism which raises and returns the tone arm to outside the record. The change cycle mechanism simultaneously opens a shutter allowing light from the lamp to bypass the wand as the wand moves back between the lamp and photocell so that operation of the change cycle mechanism is not interrupted.

This invention relates to phonograph record player mechanisms and more particularly to novel means employed therein for initiating or terminating a function of the record player. For example, it may be used to initiate a record changing cycle, to initiate a shut off cycle, to turn off the player or to start a second player.

Illustrative of the invention, it is known to provide an automatic phonograph with record changer mechanism which goes through a change cycle at the completion of each record play wherein the tone arm is lifted from the record and moved radially outwardly so as to permit a further record to be dropped or lowered from a spindle to the turntable. Thereafter, the tone arm is swung radially inwardly and set down on the starting edge of the new record so that its stylus may track in its groove as the record is rotated to record or produce sound. Means are required for initiating the change cycle at the completion of the playing of a record and in accordance with the present invention such means takes the form of a light responsive switch which is energized at the proper moment to set said mechanism in operation.

In one embodiment of the invention a stationary photocell is wired in series with a motor which is separate from the turntable drive motor and powers the changer works-mechanism. Cooperating therewith is a stationary lamp which is positioned to direct light toward the photocell. When light from the lamp impinges on the cell, its electrical resistance is lowered, permitting the motor to be energized to initiate the change cycle. Means are, however, provided which serve to prevent light rays from the lamp impinging upon the photocell, except at the appropriate interval. Such means takes the form of a trip arm having a wand coupled to the tone arm so as to rotate therewith. The wand is so disposed as to lie between the light source and the photocell while the stylus of the tone arm is tracking the groove of a record and wherefore light from the lamp does not impinge upon the cell. However, as the stylus approaches the innermost portion of the groove in the record, indicating that it has been completely played, the wand will have been moved with the tone arm to a position where it no longer blocks the passage of light from the lamp to the photocell. Thereupon, the photocell permits the changer motor to operate and to start the change cycle.

At the commencement of the change cycle, the tone arm must swing outwardly clear of the turntable sufficiently far to allow a new record to be dropped or lowered onto the turntable. However, because the wand is coupled to the tone arm, the wand again reenters between the photocell and the lamp so as to interfere with the passage of the light from the lamp to the photocell. Such would stop the motor, except that in accordance with the present invention, further means are provided in the form of a trap door or shutter which opens to provide a temporary alternate path for the light so that the photocell remains energized to maintain the changer motor operative whereby the changing cycle proceeds to its conclusion. Thereupon the changer motor actuates further mechanism to close the trap door. In place of a trap door, or shutter, a switch might be operated to temporarily bypass the photocell during this interval.

Thus, the present invention provides means in a record player or changer which, being under the control of the tone arm, will initiate the change cycle only at the end of the record playing and will require zero tripping force to actuate.

A resultant feature and/or advantage obtained by the invention when so used is that the record player can be operated at minimum needle pressure.

A further feature of the invention is that it obviates the need of mechanical linkages to the tone arm to initiate the record changer mechanism with the accompanying problems thereof as has characterized the prior art.

Another feature of the invention is that the record changer initiating means may be controlled directly by the positionment of the tone arm so that it may be accurately set and not be dependent on markings, so-called "fast grooves", or other characteristics of the individual records themselves.

Still another feature of the present invention is that it provides means useful for initiating a record player function, for example, a record change cycle, which is of a construction requiring a minimum number of components either visible to or requiring manipulation by the user and providing for marked simplicity of operation, as well as economy of manufacture.

Other and further objects, features and advantages will be apparent from the following description of an illustrated embodiment of the invention, given for the purpose of disclosure, and to be taken in conjuction with the accompanying drawings in which like character references designate like parts throughout the several views and where:

Figures 4, 5, 7:
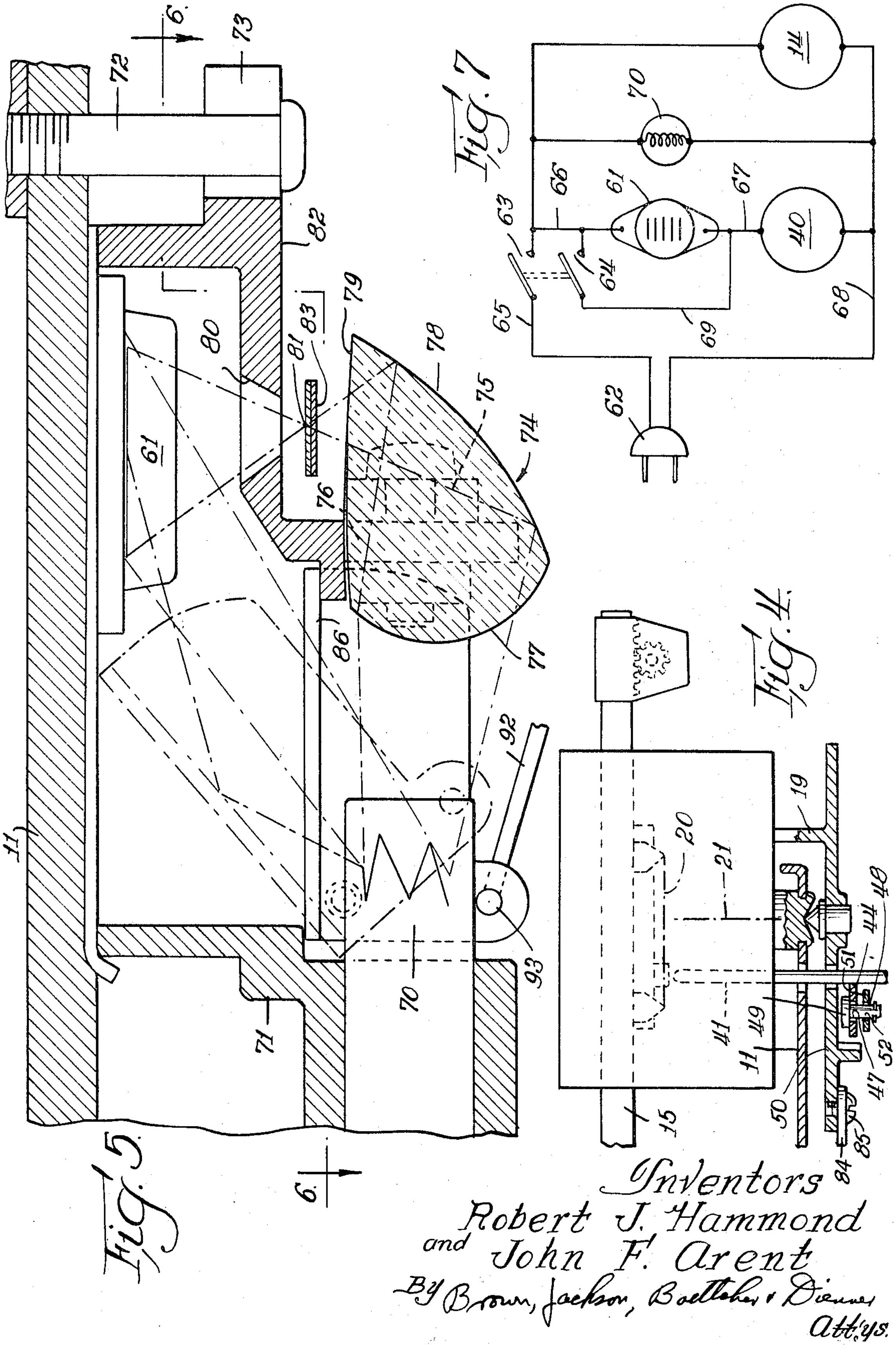
FIG. 4 is a fragmentary view illustrating the coupling of the tone arm mounting to the changer cycle means.
FIG. 5 is an enlarged sectional view of the illustrated means employed for initiating a change cycle under the control of the tone arm, said view being taken substantially along the line 5—5 of FIG. 1.
FIG. 7 is a schematic wiring diagram of the illustrated record changer.

Referring now to the several figures wherein corresponding parts are identified by like reference numerals, one embodiment of the invention will now be described in detail. As shown in FIGS. 1 through 4, an automatic phonograph record changer 10 is provided with a base mounting plate 11 on which is rotatably mounted a turntable 12 driven by a motor 14 (FIG. 7) in conventional manner. At 15 is a tone arm pivotally mounted on the base plate 11 to one side of the turntable 12 and provided in the conventional manner with a transducer cartridge 16 adjacent its free end. Cartridge 16 includes a stylus 17 for tracking in the groove of a record as it is rotated with turntable 12 in order to reproduce sound in the well known manner, the record being properly centered on the rotating turntable by centering means such as spindle 13. It will be understood that for proper operation of the tone arm 15, it must be mounted so as to be free to pivot about a vertically disposed axis in order that its stylus 17 may follow the groove in the rotating record and it must also be capable of pivoting about a horizontal axis to allow the stylus to be raised out of the groove at the completion of record playing and the tone arm removed to a rest position outside the periphery of the record to permit removal of the record and/or locating a new record on the turntable or over the played record. For the purposes of this invention any of the conventional arrangements known for mounting tone arm 15 which will permit this universal movement or pivoting of the tone arm about both a horizontal and a vertical axis may be utilized. FIG. 4 illustrates one such mounting wherein tone arm 15 is shown mounted on a supporting yoke 19 for movement about horizontal axis 20, yoke 19 in turn being rotatably mounted on plate 11 so as to be free to turn on a vertical axis 21 located to one side of turntable 12 and intersecting axis 20. Construction of such a tone arm mounting is illustrated and described in the co-pending application, Ser. No. 445,525 of John F. Arent, filed Apr. 5, 1965 and owned our assignee to which reference may be had for more complete understanding thereof and its operation.

Spindle 13 may be of the self-supporting type and is adapted to support a stack of records R′ in position above the turntable and includes means actuatable to release the lowermost record of the stack and drop or lower it to the turntable. Although the construction of such a spindle and its lowering mechanism is not a part of the present invention, preferably spindle 13 will be constructed as illustrated and described in copending application, Ser. No. 449,533 of Robert J. Hammond, filed Apr. 20, 1965 and owned by our assignee to which reference may be had for a more complete understanding of its construction and operation. However, so much thereof as is required for an understanding of the present invention will now be described.

Figure 3:
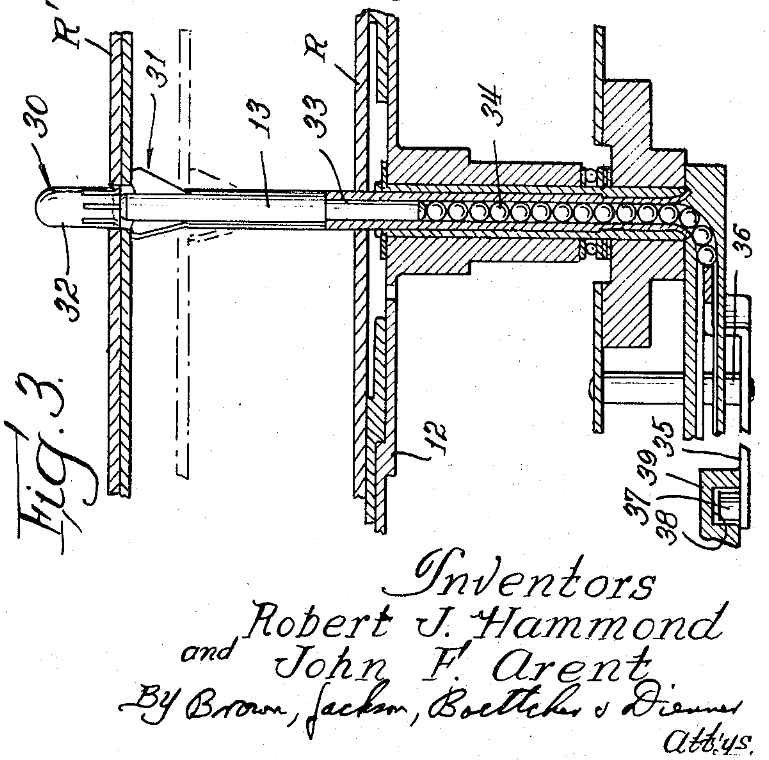
FIG. 3 is a fragmentary view of one form of record lowering mechanism with which the invention may be utilized.

Thus referring to FIG. 3, spindle 13 is illustrated as comprising secondary record supporting means 30 and primary record supporting means 31. The secondary record supporting means comprises a cap 32, having its wall divided by vertical slots so as to comprise a plurality of spaced downwardly extending fingers terminating in outwardly turned ribs positioned to be adjacent the periphery of the center hole of the next-to-lowermost record in the stack of records R′ supported on the upper end of the spindle. The primary record supporting means 31 comprise a plurality of retractable fingers which in their illustrated upper position project outwardly through vertical slots on the spindle body and support the lowermost one of the stack of records. Fingers 31 are movable downwardly to transport the lowermost record of the stack to the turntable 12 for playing. As they move downwardly the fingers are cammed inwardly of the spindle body by the bottom of the vertical slots to release the lowered record so that it is deposited on the turntable. At 33 is a rod to which said fingers are pivotally connected and from which they are biased outwardly by springs not shown.

The vertical position of rod 33 is controlled by a train of balls 34 or other operative means. In the illustrated construction, the position of said balls 34 in the track is controlled by a lever 35 pivotally mounted at 36, having one of its arms in engagement with the last ball in said train of balls. The opposite arm of lever 35 supports a follower portion 37 which follows in track 38 on the underside of a rotatable cam 39. Cam 39 is drivingly engaged to a motor 40 (FIGS. 1, 2 and 7) and the configuration of track 38 is such that in one full rotation of the cam, lever 35 will be pivoted in one direction about 36 to first lower the train of balls in the body of spindle 13, from a height in the spindle where the fingers comprising the primary record supporting means 31 are in position to support the lowermost record of the stack, downwardly under the force of gravity to a level where the fingers will be retracted into the body of the spindle to effect dropping or lowering of the lowermost record onto the turntable 12 and thereafter the lever will be rotated in the opposite direction to return the balls to their original height during which fingers 31 expand to support the bottom one of the stack which is now released by the secondary record supporting means 30 and reengages the next record thereabove as is more fully described in said Arent application, Ser. No. 445,525.

It will be recognized that in order to lower a record from the stack supported on the upper portion of spindle 13 at the completion of playing of a previously lowered record it will be necessary to also raise the tone arm so as to lift its stylus 17 out of the record groove and then to move the tone arm 15 outwardly a distance beyond the records to provide clearance for the next record to be lowered to the turntable by the spindle 13 for playing. Also after the record has been lowered to the turntable the tone arm must be also moved inwardly to a position over the starting ring of the groove in the new record and then lowered to locate its stylus in the record groove.

Synchronizing of the movement of the record lowering means and the tone arm are achieved by the cycling means which will now be described. As previously mentioned, during record play the fingers comprising the primary record supporting means 31 are in their uppermost position illustrated in FIG. 3 and support the record stack. During play of the record R on the rotating turntable, the tone arm moves inwardly toward the spindle 13 as its stylus 17 tracks in the record groove to reproduce sound. As the tone arm approaches the innermost end of the record groove, mechanism is actuated which serves to pivot the tone arm about axis 20 and thereby raise its stylus above the record groove as by means of rod 41 (FIG. 4). Mechanisms to raise the tone arm as by rod 41 are well known in the art and are therefore not necessary to be here particularly described. Once raised off the record, the tone arm is swung outwardly about axis 21 by appropriate means from beneath the record stack to permit the lowermost record to be lowered by the previously described primary record supporting means 31. One means by which this is accomplished will now be described.

On the upper surface of cam 39, containing track 38 (FIG. 3) which controls the lowering of the primary record supporting means 31, are second and third tracks 42 and 43 (FIGURE 2) which synchronize and otherwise relate the movements of the tone arm 15 to the lowering of the primary record supporting means 31. Thus referring to FIG. 2, at 44 is a lift plate shown pivotally mounted at 45 to the underside of base plate 11. One end of said lift plate 44 comprises a follower 46 tracking in the second track 42. The opposite end of lift plate 44 contains an arcuate shaped slot 47 (FIGS. 1 and 2) through which loosely extends the stem 48 (FIG. 4) of a friction clutch member 49, which clutch member is located so as to engage the under side of portion 50 of the tone arm C-shaped yoke 19 (FIG. 4) when lift plate 44 is pivoted on its mounting 45. At 51 is a drive link having one end provided with an opening 52 (FIG. 4) by which it is coupled to stem 48 of the friction clutch and having a roller 53 mounted to its opposite end following in track 43. At 54 is a cooperating link pivotally connected at one end to the underside of base plate 11 as by pivot pin 55 and at its opposite end to the drive link 51 at roller 53. Cam track 42 includes a plateau section 56 (FIG. 1) on which follower 46 (FIG. 2) of lift plate 44 rests during the playing of a record and during which interval cam 39 does not turn. In this position clutch plate 49 is disengaged from portion 50 of the tone arm mounting yoke 19 and tone arm 15 is therefore free to track the groove of the record as it is rotated by turn table 12.

Figure 2:
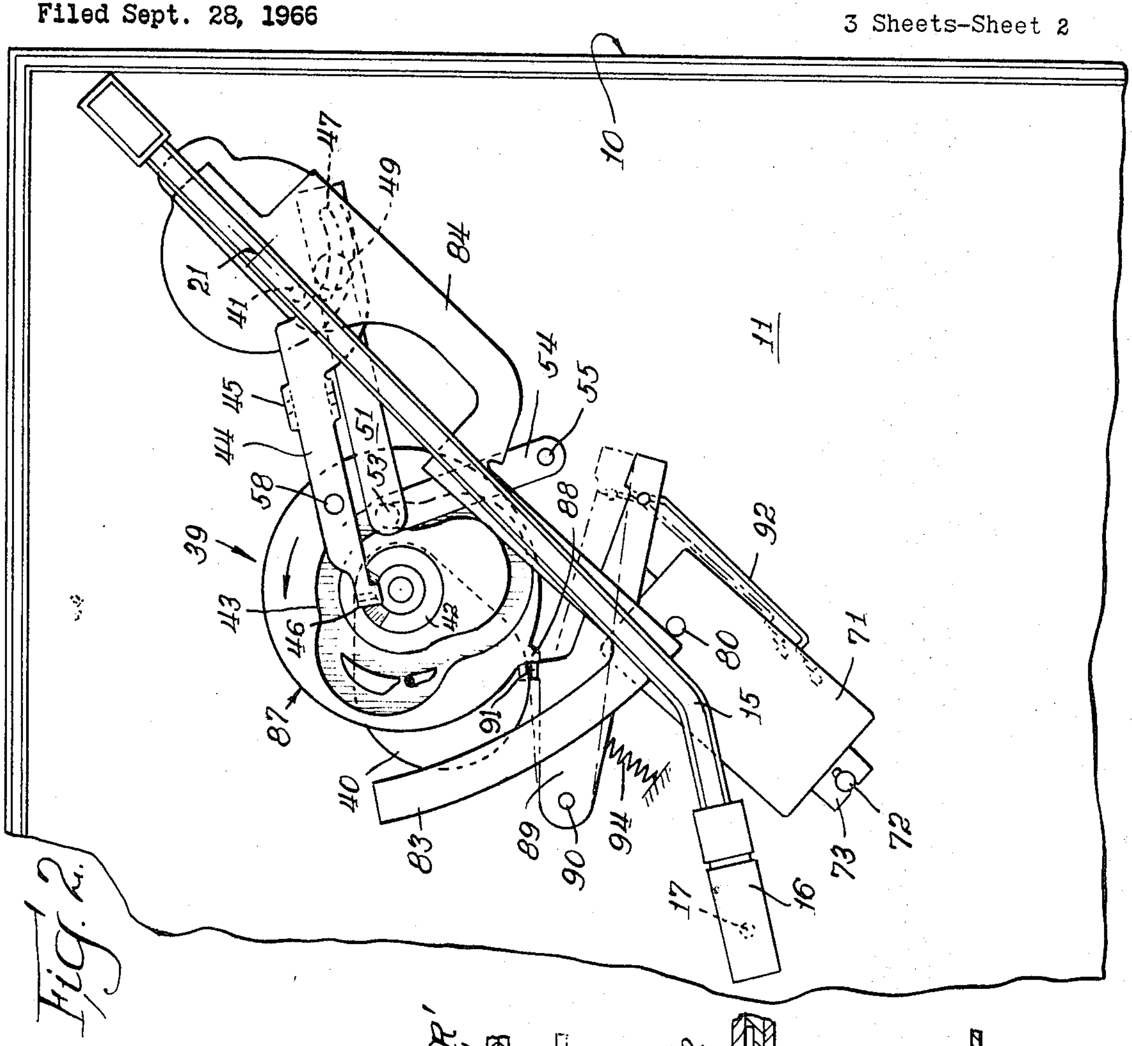
FIG. 2 is a view generally similar to FIG. 1 but showing the tone arm moved inwardly to a position where it has located its associated record changer trip arm or wand to effect operation of the record changer mechanism, as at the end of record play.
Figure 6:
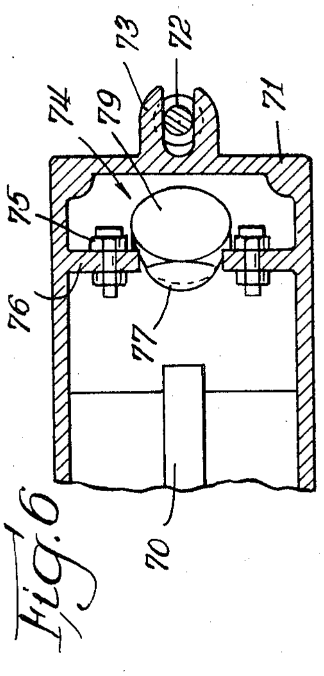
FIG. 6 is a horizontal view taken along the lines 6—6 of FIG. 5, but on a reduced scale and shows the manner of mounting the condenser lens prism of the illustrated means.

At the completion of playing of the record, tone arm 15 has assumed the position illustrated in FIG. 2 and at which moment means are brought into play, as afterwards described, to initiate energizing of motor 40 causing cam 39 to turn. As illustrated in FIG. 2, cam 39 rotates in a counterclockwise direction. Plateau 56 of cam track 42 is therefore now moved beyond follower 46, whereupon the follower moves along downwardly angled surface 57 under the urging of spring 58 into arcuate portion 59 thereof so that lift plate 44 is rocked about its pivotal connection 45 raising friction clutch 49 into clutching engagement with the under surface of portion 50. Lift pin 41 is simultaneously raised. This also raises the tone arm. Thereafter follower 46 continues in depressed portion 59 of cam track 42 so that the tone arm remains coupled to cam 39 as it is rotated by motor 40. For this purpose cam track 42 is circular in shape. Cam track 43, however, is configured so that with the tone arm thus coupled to the cam, link 51 effectively moves the tone arm outwardly from beneath the stack of records and then back to a start position over the lowered record. Timing of said tone arm movements to the lowering of the record is obtained by the related configuration and radial spacing of tracks 43 and 38 on the two sides of the cam 39.

Figure 1:
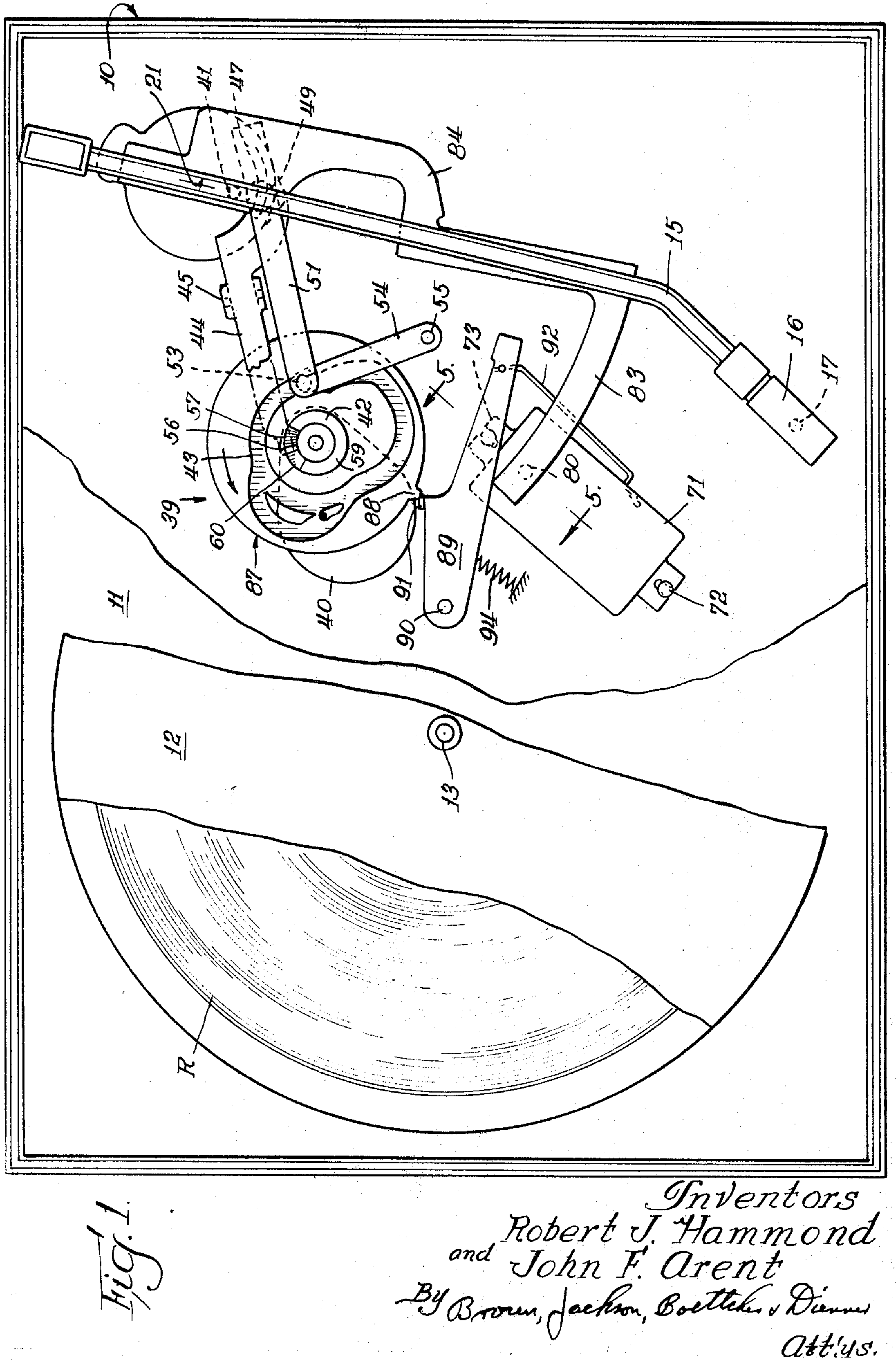
FIG. 1 is a top plan view of an automatic phonograph record player or record changer, partially broken away and shows a change cycle initiating mechanism constructed in accordance with the present invention.

In accordance with the invention, means are provided which automatically initiate the change cycle by energizing the motor 40 to drive the cam 39, at the completion of each record play through one full revolution. Imitation of the change cycle is determined by the position of the tone arm at a predetermined distance from the center of the turntable whereby it is independent of fast grooves or other markings on the record itself. This control means includes a light sensitive switch represented by photocell 61 in the circuit (FIG. 7) by which motor 40 is connected to the electric power sourse. Thus as shown in FIG. 7, assuming plug 62 to be connected into a suitable source of electrical power, switch 63 closed and switch 64 open, motor 40 is operatively connected to the power source by one of the two terminals of the plug 62, common line 65, switch 63, line 66, photocell 61, line 67, motor 40 and common line 68 which is connected to the other terminal of plug 62. Photocell 61 is, however, of the type which when in a darkened condition has sufficiently high resistance as to essentially interrupt the flow of current and in this condition of photocell 61 motor 40 is not energized. However, a lamp 70 is also connected between common lines 65 and 68 so that whenever switch 63 is closed lamp 70 is illuminated. Lamp 70 and photocell 61 are so located that light rays from the lamp are capable of impinging on the photocell to lower its resistance to a level where electrical current will flow in the circuit and motor 40 will be energized. Thus referring particularly to FIG. 5, lamp 70 is mounted within an essentially light tight compartment or housing 71 secured to the underside of supporting plate 11 by bolts 72 passing through spaced lugs 73 provided at opposite ends of said compartment (FIG. 1). Referring still to FIG. 5, housing 71 is shown provided with light directing means in the form of a prism element 74 of polystyrene or other clear transparent light transmitting material, said element having integral laterally disposed lugs 75 by which it is bolted or fastened to depending portions 76 of the housing. As illustrated, prism element 74 has a condenser lens portion 77 aligned with lamp 70 to receive light rays therefrom which are then reflected by spherical reflector surface 78 of said element upwardly through an exit lens portion 79 in the upper surface of the prism 74. It will also be understood that the entrance surface of the condenser lens portion 77 and the exit lens portion 79 are left clear to accommodate the entrance and exit of light rays from the lamp 70; however the remaining surfaces of the prism are metalized or otherwise rendered opaque. As illustrated in FIG. 5, prism element 74 is supported with its exit lens portion 79 spaced below a wall 82 of the compartment containing a conically shaped aperture 80 immediately thereover with which the mentioned photocell 61 is aligned. The surface of condenser lens 77 and reflector 78 are so curved and spaced relative to each other as to focus a beam of high light intensity in space 81 substantially midway between the exit lens portion of the condenser prism and wall 82 of the housing 71. Aperture 80 is conical in shape and only slightly larger than the diameter of the conical beam which is directed therethrough to the photocell 61 so that the photocell will be only minimally affected by ambient light or light other than that directed by the prism element 74 when lamp 70 is illuminated.

In accordance with the invention, means are provided under the control of the tone arm which act to occlude or inhibit the passage of light from the condenser prism 74 to the photocell 61 as the tone arm tracks in the groove of the record during the playing thereof wherefore photocell 61 is not illuminated and motor 40 does not turn cam 39 until the tone arm reaches a position near spindle 13 as when it has completed playing of the record previously lowered to the turntable and it is desired to lower a new record into position on the turntable. Thus, as shown in FIGS. 1 and 2, this means comprises an arcuate wand 83 comprising an integral part of a supporting arm 84 which is secured by bolts 85 to portion 50 of the tone arm mount (FIG. 4). Wand 83 is of a length and has an arcuate shape whose center corresponds to the vertical axis 21 about which the tone arm swings or pivots so that when the tone arm is in its rest position, as illustrated by FIG. 1, and also during record play, some portion of the wand will be disposed in space 81 between the exit lens portion 79 of the condenser prism and the photocell 61 to interrupt passage of light from the exit lens 79 of the prism through aperture 80 to the photocell 61. In this darkened condition of the photocell 61, motor 40 is not energized and cam 39 does not turn. Tone arm 15 moves radially inwardly of the record as its stylus tracks the record groove with the rotation of the turntable; and wand 83 continues to interrupt the passage of light from the condenser lens to the photocell until the tone arm has been moved to an inward position as illustrated in FIG. 2. In this inward position of the tone arm 15, wand 83 has moved past the aperture 80 so that it no longer interrupts the passage of light to the photocell 61. The photocell thereupon becomes conductive and allows motor 40 to be energized whereupon it starts to rotate the cycling means or cam 39 in its counterclockwise direction as described above.

As cam 39 rotates to move the tone arm back outwardly again toward its rest position indicated in FIG. 1, it will be understood that wand 83 moves with the tone arm so that it again interrupts the passage of light to the photocell 61. As described above, this would have the effect of deenergizing motor 40. However, the invention also includes means providing a temporary or alternate path for light from lamp 70 bypassing the wand on this return stroke of the tone arm so that the photocell 61 remains conductive and motor 40 does not stop. Referring to FIG. 5, lamp 70 and photocell 61 are shown on opposite sides of a shutter 86 pivotally connected to a wall portion of housing 71. Shutter 86 is normally closed so that light can pass to the photocell 61 only as directed by prism 74 through aperture 80. However, when shutter 86 is opened to the dotted line position indicated in said FIG. 5, light rays may directly pass to the photocell 61. Referring now to FIG. 2, means are illustrated under the control of the cam 39 which control the opening and closing of the shutter 86. This means comprises a fourth cam track 87 constituting the outer peripheral edge of the cam 39. Cam track 87 includes a projecting portion 88 which is at a greater radial distance from the center of the cam than the remainder of its periphery. As shown in said FIG. 2, an actuating arm 89 has one end pivotally connected at 90 to the supporting plate 11 and an intermediately disposed cam follower portion 91 which rides on the fourth cam track 87 or periphery of cam 39. The opposite end of actuating arm 89 is connected to one end of a link 92 having its opposite end connected to the shutter 86 as at 93 (FIG. 5). In the stopped or initial position of the cycling cam 39, projection 88 is in engagement with the cam follower 91 of the actuating arm 89 so that the actuating arm holds the shutter 86 in its closed position indicated by full lines in FIG. 5. In the closed position of the shutter with the wand 83 in the space 81 between the exit lens portion 79 of the condenser prism 74 and aperture 80 of the housing no light from lamp 70 is able to reach the photocell 61 and motor 40 is not energized. However, as soon as wand 83 has been moved to the position indicated in FIG. 2, as occurs when the tone arm has been moved to completion of record playing, light from lamp 70 can pass via the condenser lens prism through aperture 80 to the photocell. Motor 40 therefore starts to turn cam 39 whereupon projection 88 moves out of its engagement with the cam follower 91 on the actuating arm 89 which then under the action of spring 94 moves inwardly to engage surface portion 87 of the fourth cam track or periphery of cam 39. Actuating arm 89 is therefore moved to the position indicated by phantom lines in FIG. 2 and shutter 86 is pivoted by link 92 to the raised position indicated by phantom lines in FIG. 5. Shutter 86 remains in this raised position until cam 39 has made a complete revolution and projection 88 again moves actuating arm 89 back to its full line position against the action of spring 94 again closing shutter 86. Therefore, once the tone arm has moved to its inner position, as illustrated by FIG. 2, and the photocell has been exposed to light through aperture 80, motor 40 remains energized until the cycling means represented by cam 39 has completed a full revolution assuring completion of the change cycle involving the lowering of a new record onto the turntable from the overhead stack on spindle 13 and the proper positioning of the tone arm for playing the newly lowered record.

It will be appreciated that as thus described, the lowering of each record after the first and its playing will proceed automatically and without the attention of the operator. However, it is also necessary to provide other means for initially lowering the first record from the spindle and to properly locate the tone arm in play position thereover, since the actuation of arm 89 as thus far described is predicated on the wand 83 being moved to a position beyond aperture 80 at the completion of record play which initially energizes motor 40. For this purpose, the mentioned second switch 64 is coupled to switch 63. Switch 64 is normally held open. However, means are provided whereby it can be momentarily closed when switch 63 is initially closed to initially start the record changer. Thus referring to FIG. 7, it will be appreciated that when switch 63 is closed manually, it completes a circuit via common lines 65, 68 to motor 14 to start turntable 12 to rotating. Additionally, it also energizes lamp 70. However, since the tone arm is in a position of rest indicated by FIG. 1, wand 83 lies between lamp 70 and photocell 61 and prevents the passage of light to the photocell which therefore is dark and motor 40 is not energized. However, because switch 64 is also momentarily closed when switch 63 is closed, a temporary circuit is also completed to motor 40 which bypasses photocell 61. This circuit comprises common lines 65, switch 63, line 66, switch 64, line 69, motor 40, and line 68. Momentary closing of switch 64 therefore causes motor 40 to rotate cam 39 enough that its projection 88 is moved away from follower 91 of the actuating arm 89, whereupon shutter 86 will open allowing lamp 70 to illuminate the photocell 61. Cam 39 will therefore rotate through a full 360° to effect the cycle change. Thereafter, the movement of wand 83 to the position indicated in FIG. 2 as the tone arm 15 completes the playing of a record will suffice to again initiate the change cycle to lower the next record and reset the tone arm wherefore it is only necessary that switch 64 be momentarily closed with the closing of switch 63; that is, long enough so that cam 39 will move the amount necessary to rock actuating arm 89 sufficiently to open the shutter 86.

From the above description, it will be apparent that all the recited objects and advantages and features of the invention have been demonstrated as obtainable in a convenient, highly economical and exceedingly practical manner.

It will be further understood that the aforedescribed movement of the wand 83 with the tone arm to actuate a light sensitive switch or photocell at a predetermined point or points on a record also may be used to control by way of initiating or terminating anyone of a number of other functions of a conventional record player. For example, the photocell could be used in the circuit of a solenoid arranged to actuate the mechanical trip mechanism of a phonograph player or changer. It could also be used in a circuit to shut off the phonograph or to actuate a second phonograph or other auxiliary switching circuit.

Thus having described our invention, we claim:

1. In a phonograph record player having a tone arm for playing records, a first means adapted to effect a function of the record player, and control means which actuate the means to initiate the function, said control means comprising: a circuit including a light activated switch operatively connected to the first means; a source directing light toward the switch to activate the same; a wand operatively connected to the tone arm to move with the tone arm between the light source and the switch during record play to prevent activation of the switch by light from said source, the wand passing from between the light source and the switch when the tone arm reaches a position at a predetermined distance from the center of the turntable where it permits light from the source to pass to the switch and thereby to actuate the first means causing it to initiate the function; and further means operated by the first means which cause the first means to continue the function through completion once actuated by activation of the light switch.

2. In an automatic phonograph record changer having a tone arm for playing records which are dropped one-by-one to a rotatable turntable associated therewith, cycling means which are adapted to effect a change cycle including moving the tone arm outwardly a distance sufficient to permit a record to be lowered to the turntable and then moving the tone arm to a starting position over the record after the same has been lowered to the turntable, and control means which actuate the cycling means to initiate a change cycle at the completion of the playing of a record, said control means comprising: a circuit including a light sensitive switch operatively connected to the cycling means; a source directing light toward the switch to activate the same; a wand operatively connected to the tone arm to move with the tone arm between the light source and the switch during record play to prevent activation of the switch by light from the source, the wand passing from between the light source and the switch when the tone arm reaches a position at a predetermined distance from the center of the turntable to permit light from the source to pass to the switch and thereby cause the cycling means to initiate the change cycle, the wand again interrupting passage of light from the source to the switch as the tone arm is moved outwardly by the cycling means; and further means operated by the cycling means which bypass the effect of the wand so as to hold the circuit closed as the tone arm moves outwardly to allow the cycling means to complete the change cycle once initiated.

3. In an automatic record changer having a tone arm for playing records which are dropped one-by-one to a rotatable turntable associated therewith, cycling means which are adapted to effect a change cycle including moving the tone arm outwardly a distance sufficient to permit a record to be lowered to the turntable and then moving the tone arm to a starting position over the record after the same has been lowered to the turntable, and control means which actuate the cycling means to initiate a change cycle at the completion of the playing of a record, said control means comprising: a circuit including a light sensitive switch operatively connected to the cycling means: a source directing light toward the switch to activate the same: and a wand operatively connected to the tone arm with the wand between the light source and the switch during record play to prevent actuation of the switch by light from the source; the wand passing from between the light source and the switch when the tone arm reaches a position where the record is played to permit light from the source to pass the switch and thereby cause the cycling means to initiate the change cycle; and means operated by the cycling means which opens an alternate light path from the light source to the switch to allow the cycling means to complete the cycle, once initiated.

4. In an automatic phonograph record changer having a tone arm for playing records which are dropped one-by-one to a rotatable turntable associated therewith, cycling means which are adapted to effect a change cycle including moving the tone arm outwardly beyond the record a distance sufficient to permit a record to be lowered to the turntable and then moving the tone arm to a starting position over the record after the same has been lowered to the turntable; a changer motor for driving the cycling means; and control means which energizes the changer motor to initiate a change cycle at the completion of the playing of a record, said control means comprising: a circuit including a light sensitive switch operatively connected to the changer-motor, said switch normally holding the circuit open; a source for directing light toward the switch; and means operatively connected to the tone arm to move with said tone arm between the light source and the switch so that the condition of illumination of the switch by the source is changed when the tone arm reaches a position at a predetermined distance from the center of the turntable, the changed illumination of the switch causing the switch to close the circuit to the changer-motor and thereby energize the changer-motor to drive the cycling means to initiate the change cycle, the means operatively connected to the tone arm moving therewith between the light source and switch as the tone arm is moved outwardly by the cycling means; and further means operated by the cycling means to bypass the effect of said means moving back between the light source and switch such that the changer-motor remains energized until completion of the change cycle once initiated.

5. In an automatic phonograph record changer having a tone arm for playing records which are dropped one-by-one to a turntable associated therewith, cycling means which move the tone arm outwardly a distance sufficient to permit a record to be lowered to the turntable and thereafter move the tone arm to a starting position over the record after the same has been lowered to the turntable; a changer-motor for driving the cycling means; and control means which energizes the changer motor to initiate a change cycle at the completion of the playing of a record, said control means comprising: a light source; a circuit including a photocell operatively connected to the changer-motor, said photocell being positioned to be illuminated by light from said source; a wand operatively connected to the tone arm which moves with the tone arm between the light source and the photocell during record play to interrupt the passage of light and thereby prevent actuation of the photocell, the wand passing from between the light source and the photocell when the tone arm reaches a position at a predetermined distance from the center at the turntable allowing the light source to activate the photocell and thereby energize the changer-motor to drive the cycling means to carry out the change cycle, said wand again interrupting said light path as the cycling means moves the tone arm outwardly during the change cycle; and baffle means which are temporarily opened when the tone arm is moved outwardly by the cycling means to provide an alternate path from the light source to the photocell as the tone arm moves outwardly to permit cycling means to complete the change cycle.

6. In an automatic record changer, the combination as claimed in claim 5, wherein the baffle means comprises a movable shutter disposed between the light source and the photocell outside the path of movement of wand and operated by the cycling means.

7. In an automatic record changer, the combination as claimed in claim 6, wherein the cycling means includes a rotatable cam driven by the changer-motor, and a cam follower operatively connected to the shutter and associated with said cam to open the shutter on initiation of its rotation by the changer-motor and to close the shutter upon completion of the change cycle.

8. In an automatic record changer, the combination as claimed in claim 5, wherein means are provided comprising a reflector adapted to direct light from the light source to the photocell so as to provide a path of light interruptable by movement of the wand with the tone arm.

9. In an automatic record changer, the combination as claimed in claim 5, wherein the baffle means comprises a normally closed shutter disposed between the light source and the photocell, the combination further including means which directs a beam of light from the light source to the photocell along a path to one side of the shutter means, said beam having a diameter and its path being located so to be interrupted by the wand as the tone arm is moved inwardly during playing of a record.

10. In an automatic record changer, the combination as claimed in claim 8, wherein the reflector comprises a prism member which includes a condenser portion on its forward side and is positioned to receive light from the light source and focus the light into a beam directed to the photocell, said beam having its focal point adjacent the path through which the wand moves.

References Cited

UNITED STATES PATENTS

| | | | |
|---|---|---|---|
| 2,056,372 | 10/1936 | Schwartz | 274—15 X |
| 2,085,582 | 6/1937 | Guedon | 274—1.11 X |
| 2,130,296 | 9/1938 | Caldwell | 250—231 |
| 2,345,684 | 4/1944 | Pressley | 192—118 |
| 2,948,799 | 8/1960 | Weise | 317—124 |
| 3,010,026 | 11/1961 | Schake | 317—124 X |

HARRY N. HAROIAN, Primary Examiner

U.S. Cl. X.R.

274—9; 274—15